H. E. COLLEYS.
ROLLER CULTIVATOR.
APPLICATION FILED DEC. 19, 1914.

1,162,902.

Patented Dec. 7, 1915.
2 SHEETS—SHEET 1.

Inventor
H. E. Colleys

Witnesses
Robert M. Sutphen
A. S. Hind

By Watson E. Coleman
Attorney

H. E. COLLEYS.
ROLLER CULTIVATOR.
APPLICATION FILED DEC. 19, 1914.
1,162,902.
Patented Dec. 7, 1915.
2 SHEETS—SHEET 2.
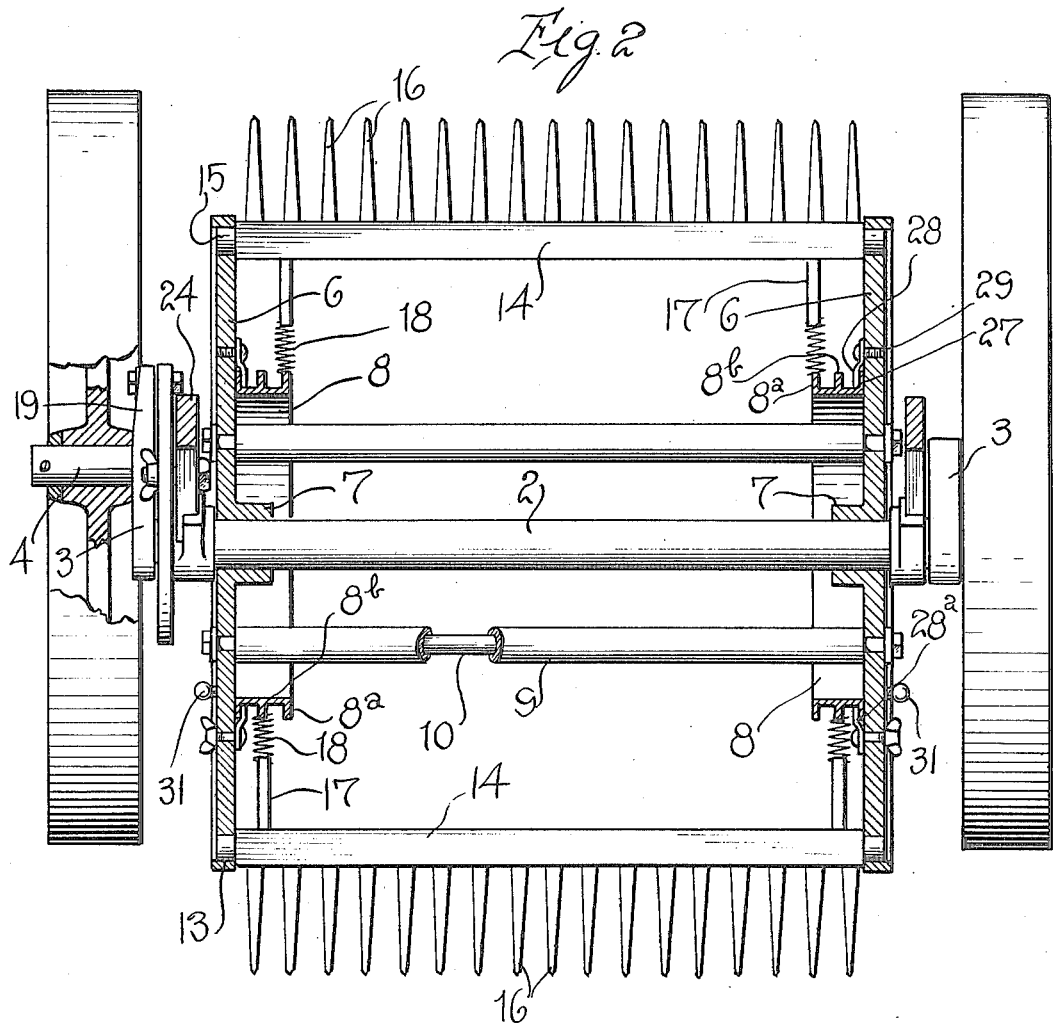
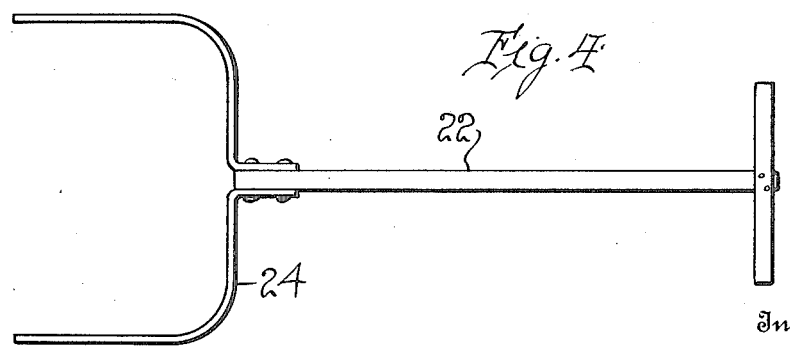
Witnesses
Robert M. Sutphen
A. I. Hind
Inventor
H. E. Colleys
By Watson E. Coleman
Attorney

UNITED STATES PATENT OFFICE.

HENRY EDWARD COLLEYS, OF HAMMOND, INDIANA.

ROLLER-CULTIVATOR.

1,162,902. Specification of Letters Patent. Patented Dec. 7, 1915.

Application filed December 19, 1914. Serial No. 878,111.

*To all whom it may concern:*

Be it known that I, HENRY EDWARD COLLEYS, a citizen of the United States, residing at Hammond, in the county of Lake and State of Indiana, have invented certain new and useful Improvements in Roller-Cultivators, of which the following is a specification, reference being had to the accompanying drawings.

My invention relates to agricultural implements, and particularly to cultivating devices.

The primary object of my invention is the provision of a device for cultivating lawns, or for use in like situations, so constructed as to form vertical perforations in a lawn by which water may pass to the subsoil.

A further object of the invention is the provision of an implement of this character having a plurality of rows of spikes annularly arranged, and with means whereby these spikes may be projected vertically into a lawn and withdrawn vertically therefrom so that while the perforations shall be made in the lawn as previously stated, the spikes making the perforations will not tear the lawn.

A further object of the invention is the provision of a machine for the purpose above stated in which the rotatable members carrying the spikes may be raised or lowered so as to place the spikes in operative or inoperative position.

A further object of the invention is to provide means whereby the operative position of the spikes may be changed so that the machine will operate either by being pushed or pulled.

Other objects will appear in the course of the following description.

My invention is illustrated in the accompanying drawings, wherein—

Figure 1:
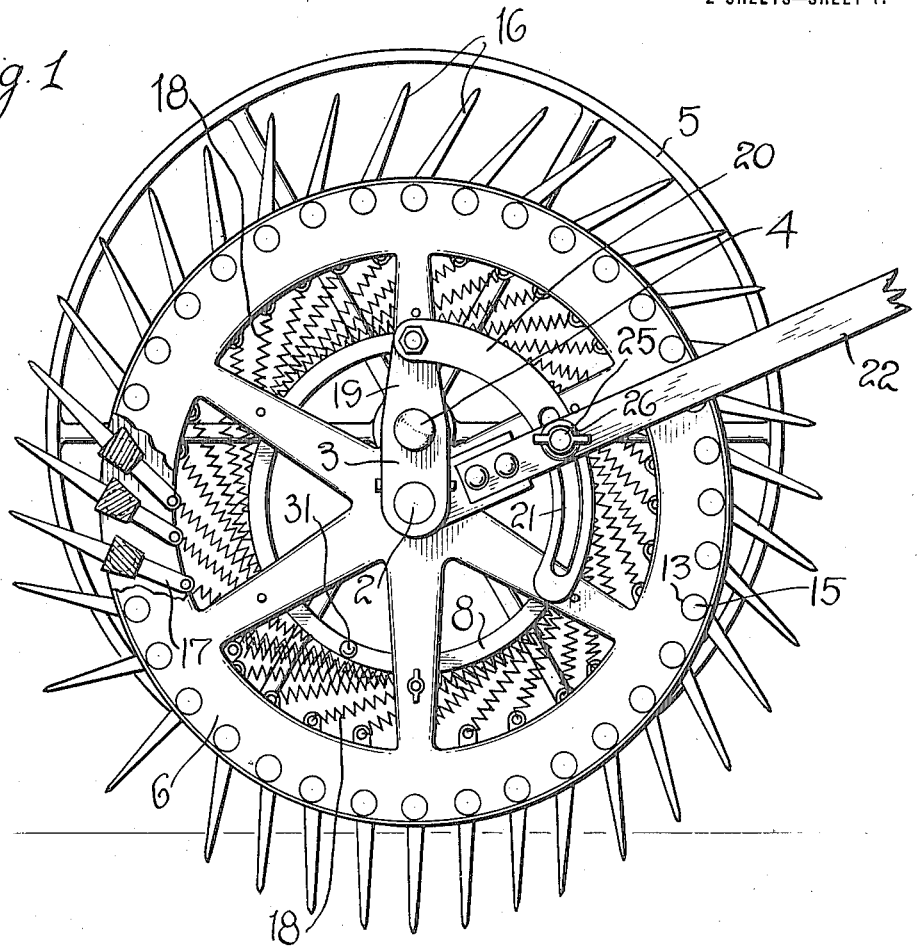
Figure 3:
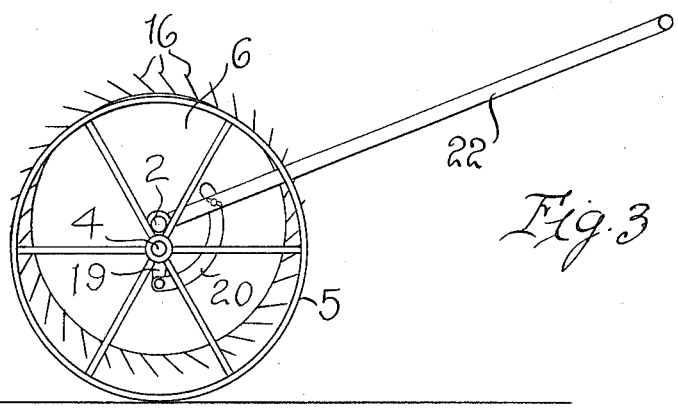

Figure 1 is a side elevation, partly in section, of my lawn perforator or cultivator, the near traction wheel being removed; Fig. 2 is a transverse vertical section therethrough; Fig. 3 is a side elevation showing the spike carrying members raised into inoperative position; Fig. 4 is a plan view of the handle.

Referring to these drawings, 2 designates an axle, the extremities of which are cranked as at 3 and formed with the outwardly projecting crank arms 4, upon which the traction wheels 5 are loosely mounted for free rotation, the traction wheels being held in position by any suitable means, as by nuts or cotter pins.

Rotatably mounted upon the middle portion of the axle 2 and freely rotatable thereon are the spaced rotatable disks or wheels 6. Each of these wheels is formed with a relatively wide hub 7 bearing against the axle 2, and each of these wheels carries the annular inwardly projecting annulus 8, this annulus being concentric to the axle and having inwardly projecting ribs $8^a$ and $8^b$. The disks 6 are held in spaced relation to each other by means of a plurality of sleeves 9 and transversely extending bolt rods 10 which are detachably engaged with the disks or wheels 6 by means of nuts 11.

Each of the wheels 6 adjacent its circumference and inward of the outwardly extending circumferential flange 12 is formed with a plurality of circular bearing openings 13. Disposed between the disks and carried thereby are the rotatable bars 14, the ends of the bars being reduced so as to extend into and have rotatable bearing in the openings 12, these reduced ends being designated 15. Each of the bars 14 carries upon it a plurality of spikes 16 which are preferably tapered each toward its point. The outer ends of each bar 14 are formed with an inwardly projecting arm 17, the inner end of each arm being resiliently connected to the adjacent annulus 8 by means of springs 18, these springs being preferably coiled springs. It will thus be seen that the bars 14 are rotatably mounted in the disks or wheels 6 and that the spikes are held in normal position by means of the springs 18. It will also be understood that each bar 14 is independently rotatable with relation to any other bar of the series, and that there are a pair of springs 18 to each of these bars 14.

As illustrated in Fig. 2, each annulus 8 is formed with two inwardly projecting ribs $8^a$ and $8^b$ laterally spaced from each other, and the arms 17 of the several rotatable bars 14 are disposed alternately in approximate alinement with one or the other of the ribs 8ᵃ and 8ᵇ. The alternate springs 18 will therefore be disposed out of alinement with the other springs so that the springs and the arms will not interfere with each other in the operation of the mechanism. While I do not wish to limit myself to this, I prefer, for reasons which will hereafter be stated, to form the annulus 8 as a separate piece from the adjacent wheel, so that it may be rotatively adjusted with relation to the wheel. The details of this construction will be later described, however.

For the purpose of adjusting the spiked drum formed by the disks 6 and the bars 14, into and out of operative relation to the ground, I prolong one of the cranked axles 3 so as to provide an upwardly projecting arm 19 which carries at its upper end the arcuate quadrant 20 which is longitudinally slotted as at 21.

A handle 22 is preferably disposed at the middle plane of the roller and is provided with a cross bar at its outer end whereby the roller may be propelled. The handle at its lower end is formed with the laterally projecting arms 24, the ends of which are bent so as to extend radially toward the shaft 2, these ends being loosely mounted upon the shaft 2. One of these end portions 24 carries upon it a bolt 25 engaged by a thumb nut 26, this bolt passing through the slot 21 and the thumb nut engaging against the face of the quadrant so as to hold the handle set in any adjusted position upon the quadrant. By loosening the thumb nut, the position of the crank arm can be adjusted so that by moving the handle forward over the machine, the spiked roller will be raised clear of the ground, as in Fig. 3, its weight then being carried entirely upon the traction wheels 5. This is done when it is not desired that the spikes come in contact with the ground or other surface that the roller is being moved over. When it is desired that the spikes be brought in contact with the ground, the handle is moved in a reverse direction as illustrated in Fig. 1, which turns the crank shaft with relation to the supporting wheels so as to carry the spike and roller downward.

The peculiar construction and mounting of the spike carrying bars 14 is such that as the roller moves over the lawn or other surface to be cultivated, assuming that the roller formed by the disk 6 and bars 14 is in an operative position, the spikes will enter the ground and at the moment they engage the ground will be turned as the roller moves forward into a vertical position and of course forced downward into the ground, the springs yielding to permit this rotation of the bars 14 so that the spikes shall be held in this vertical position. As the spikes pass rearward of a vertical plane, cutting the axle, they will still be maintained in their vertical position by the yielding of the springs and will be so maintained until they have passed out of the ground, whereupon the springs will again urge them into their normal position. By this means a lawn or other surface may be perforated quite deeply, these perforations running vertically, without in any way tearing or otherwise injuring the lawn. Rain will gather in these perforations and will seep into the sub-stratum.

In order to provide for the adjustment of the annulus 8, as previously referred to, I preferably form this annulus with an inwardly projecting flange 27 which bears against the spokes of the adjacent wheel 6 and is held in position upon the spokes by a plurality of clips 28, there being as many of these clips as there are spokes, each clip having a portion lying against the spoke and pierced for the passage of a screw 29, and each clip also having an offset portion which engages the outer face of the flange 27. One of the clips, designated 28ᵃ has a bolt provided with a thumb nut 30 which may be tightened to hold the annulus firmly in position upon the spoke. The annulus is provided with a handle 31 whereby it may be rotatively shifted upon the several clips with relation to the wheels 6, after which the thumb nut 30 may be tightened up to hold the annulus in its adjusted position. It will be understood that the clips 28 merely serve to support the annulus by locking it in its adjusted position, but that this locking of the annulus is secured by the clip 28ᵃ which is disposed adjacent to the handle 31. Preferably the handle 31 whereby the annulus may be rotatively adjusted is disposed opposite to the sector 20. It will be seen that by shifting the annulus 8 to a certain extent the position of the spokes illustrated in Fig. 1 may be entirely reversed and that thus the spiked roller in place of being pulled, as is necessary with the construction illustrated in Fig. 1, may be pushed.

While I have illustrated my invention as applied to a cultivator adapted to be pushed or pulled manually over the surface of the lawn, it is of course to be understood that the principle of the invention may be equally well applied to constructions adapted to be driven by power or drawn by horses, and therefore I do not wish to be limited to the exact details of construction as illustrated, as the figures merely show what I believe to be a very convenient form of my apparatus.

Having described my invention what I claim is:

1. In a cultivator of the character described, rotatable members, a plurality of transversely extending spike carrying members each pivotally mounted in the first named members, a plurality of spikes extending from each of said carrying members, and yielding means holding said carrying members with the spikes in a tangentially projected position and directed toward the direction of movement of the cultivator but yielding to permit the spikes to enter and remain in the ground until withdrawn therefrom in a vertical position.

2. A cultivator of the character described including oppositely disposed rotatably mounted supporting members, said members being connected to each other for unitary movement, a plurality of bars extending between said members, and rotatably mounted at their ends in said members, said bars being arranged in a circular series, a plurality of spikes extending outward from each bar, arms extending inward from each bar at its ends, and springs extending inward from each arm and fixedly connected at their inner ends, said springs permitting the bars to rotate, but urging the bars to a position to carry the spikes in a tangential direction, and means for raising or lowering the supporting members and bars.

3. A cultivator of the character described, including oppositely disposed rotatably mounted disks, each disk carrying an inwardly projecting annulus spaced from the periphery of the disk, a plurality of spike carrying bars rotatably mounted in said disks, a plurality of projecting spikes mounted upon each of the bars, arms projecting radially from each of the bars, and coiled springs extending one from each of said arms to the annulus on the disk and yieldingly holding the bars in position to project their spikes tangentially, but yielding to permit the spikes to turn into a position radial to the axis of rotation of said disks.

4. In a cultivator of the character described, a plurality of rows of ground engaging spikes, the rows of spikes extending transversely across the line of draft of the cultivator and the several rows being arranged in a circular series, supporting means for the rows of spikes whereby the spikes may be carried over the ground and brought successively into engagement therewith, and means yieldingly holding the spikes in a direction tangential to their path of movement and toward the direction of movement of the cultivator, said means causing the spikes to enter the ground in a vertical plane and remain in said vertical plane until they have left the ground.

5. A cultivator of the character described, including oppositely disposed rotatably mounted supporting members, a plurality of transversely extending spike carrying bars, each rotatably mounted at its ends in said members and each carrying a plurality of radially projecting spikes, arms extending inward from each bar, contractile springs extending inward from each arm, and a rotatively adjustable annulus mounted on each of said supporting members to which the inner ends of said springs are connected.

6. A cultivator of the character described, including oppositely disposed rotatably mounted supporting members, a plurality of transversely extending spike carrying bars, each rotatably mounted at its ends in said members and each carrying a plurality of radially projecting spikes, arms extending inward from each bar, contractile springs extending inward from each arm, a rotatively adjustable annulus mounted on each of said supporting members to which the inner ends of said springs are connected, and means on said supporting members for holding the annuli in their adjusted positions.

7. In a cultivator of the character described, a shaft, oppositely disposed rotatably mounted disks carried upon the shaft, a series of radially disposed clips mounted upon the disks, an annulus for each of said disks having a flange supported in said clips, the annulus being rotatively adjustable within the clips, means for holding the annulus in its adjusted position, a plurality of spike carrying bars rotatably mounted in said disks, a plurality of projecting spikes mounted upon each of said bars, arms projecting radially one from each end of the bars, and contractile springs extending one from each of said arms to the said annulus and yieldingly holding the bars in position to project their spikes tangentially, but yielding to permit the spikes to return to a position radial to the axis of rotation of said disks.

8. In a cultivator of the character described, a plurality of rows of ground engaging spikes, the rows extending transversely across the line of draft of the cultivator and the several rows being arranged in a circular series, means for supporting the rows of spikes and carrying them in a circular path, springs operatively connected to each row of spikes and yieldingly holding the spikes of said row projected in a predetermined direction, and means for adjustably supporting the inner ends of the springs, said means being adjustable concentric to the axis of motion of the spikes whereby to shift the angle of direction of said springs.

9. In a cultivator of the character described, a plurality of rows of ground engaging spikes, the rows extending transversely across the line of draft of the cultivator and the several rows being arranged in a circular series, means for supporting the rows of spikes and carrying them in a circular path, springs operatively connected to each row of spikes and yieldingly holding the spikes of said row projected in a predetermined direction, means for adjustably supporting the inner ends of the springs, and common means for adjustably supporting the inner ends of all of the springs, said means being adjustable concentric to the common axis of rotation of the spikes.

In testimony whereof I hereunto affix my signature in the presence of two witnesses.

HENRY EDWARD COLLEYS.

Witnesses:
PAUL B. LIPINSKI,
B. GEHRING.